United States Patent [19]

Labelle

[11] Patent Number: 4,726,709
[45] Date of Patent: Feb. 23, 1988

[54] SEALING ASSEMBLIES

[76] Inventor: Camille Labelle, 52 Allan St., Greenfield Park, Quebec, Canada, J4V 2W7

[21] Appl. No.: 910,728

[22] Filed: Sep. 23, 1986

[51] Int. Cl.⁴ .......................... E02B 7/28; E02B 7/54
[52] U.S. Cl. .................................. 405/103; 405/104; 405/106
[58] Field of Search ............... 405/104, 105, 106, 87, 405/103; 49/495

[56] References Cited

U.S. PATENT DOCUMENTS

| | | | |
|---|---|---|---|
| 2,984,074 | 5/1961 | Le Clair et al. | 405/106 |
| 3,266,190 | 8/1966 | Jackson | 49/495 X |
| 4,220,420 | 9/1980 | Aston et al. | 405/104 |
| 4,226,553 | 10/1980 | Whipps et al. | 405/106 |

Primary Examiner—David H. Corbin

[57] ABSTRACT

This invention is directed toward improved liquid sealing assemblies. The sealing assemblies are particularly useful in water control gates and in one embodiment have an elastomeric seal strip with a U-shaped cross-section defined by a web and a pair of arms extending transversely from the web. The seal strip is adapted to be fastened to a sealing location by mounting means located between the arms of the seal strip. The web of the seal strip is sandwiched between the mounting means and the sealing location, with the arms of the seal strip projecting just past the mounting means to effect sealing with their free ends.

In another embodiment, the sealing assemblies have first and second elastomeric seal strips adapted to be mounted on two relatively movable members. One of the seal strips, mounted on one of the members, has a bendable portion that projects into the path of relative movement of the other seal strip mounted on the other member so that when the seal strips abut, the bendable portion gives slightly to give better sealing between the seal strips.

The invention is also directed toward water control gates incorporating the sealing assemblies.

14 Claims, 9 Drawing Figures

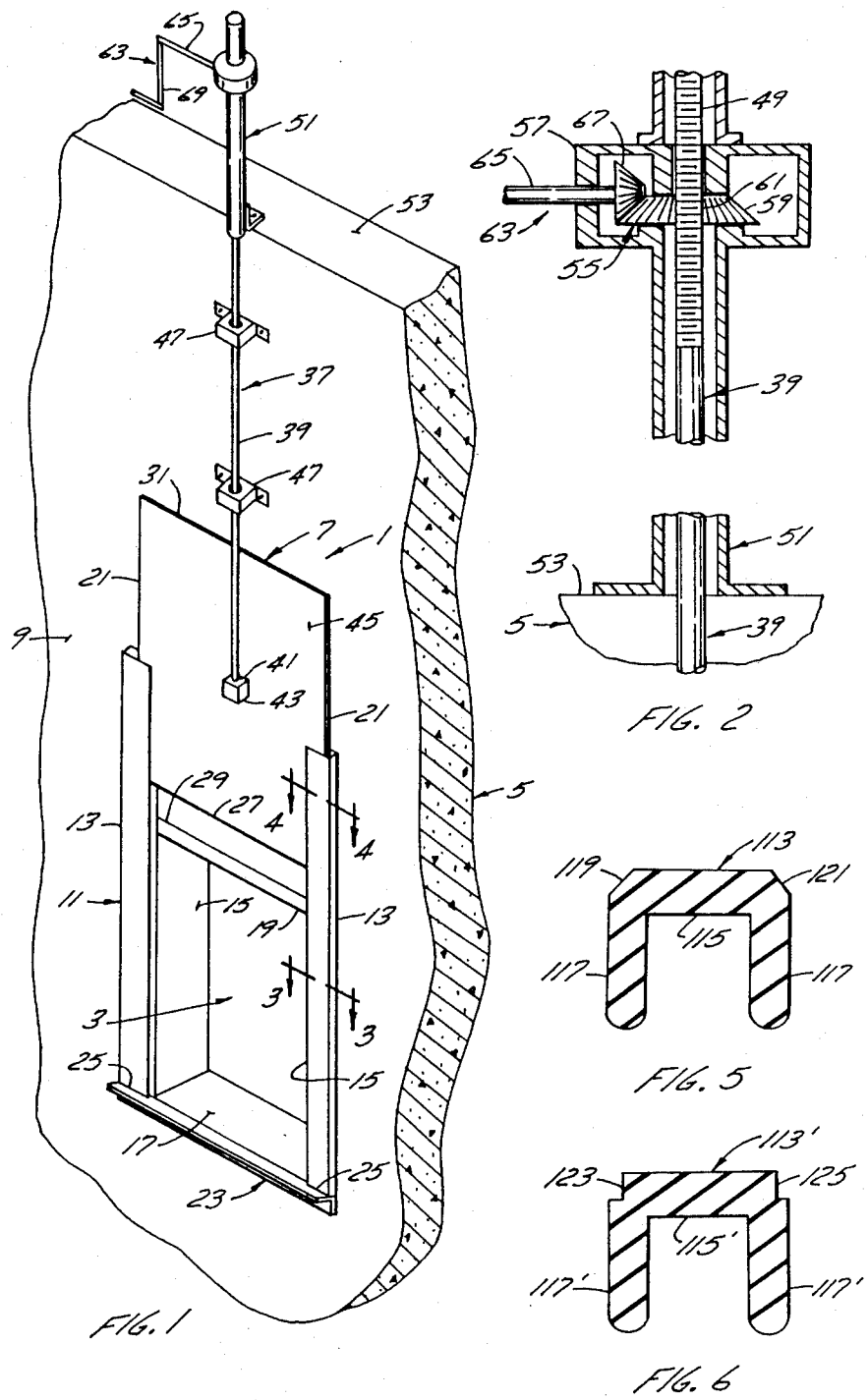

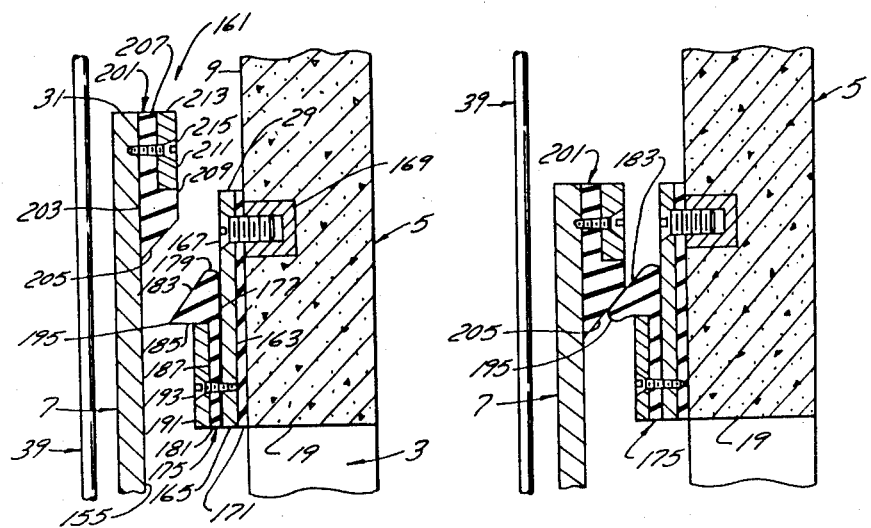
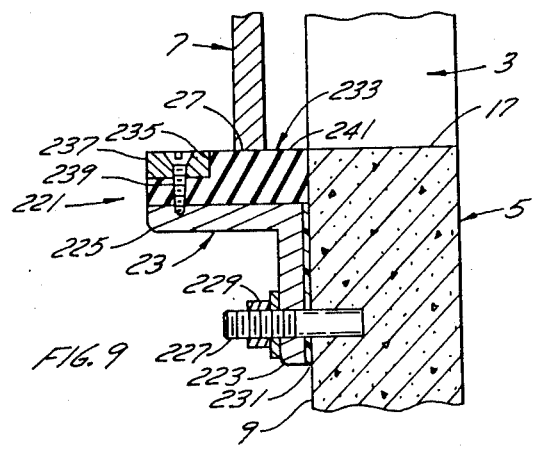

SEALING ASSEMBLIES

BACKGROUND OF THE INVENTION

1. Field of the Invention

This invention is directed toward improved scaling assemblies.

The invention is also directed toward a control gate construction incorporating the improved scaling assemblies.

2. Description of the Prior Art

Control gates, employing a slide to close an opening within a wall, are well known. The slide is moved up or down within guide means mounted on the wall adjacent the vertical sides of the opening. Side scaling means are provided in the guide means, extending parallel to the direction of movement of the slide, to seal the slide to the guide means and thus to the wall to prevent water or other liquid from flowing past the sides of the slide. Bottom sealing means are provided on the wall adjacent the bottom of the opening to seal the bottom of the slide to the wall to prevent water or other liquid from flowing past the bottom of the slide when in a closed position. Top sealing means are also provided on the wall adjacent the top of the opening to seal the top of the slide to the wall. The top and bottom sealing means extend transverse to the direction of movement of the slide. Thus the opening is sealed on all four sides by the slide and the sealing means when the slide is in a closed position. Examples of seals in water control gates extending in a direction parallel to the direction of movement of the slide are shown in U.S. Pat. Nos. 2,643,521; 2,984,074; 3,326,002 and 3,371,493. Examples of scale extending in a direction transverse to the direction of movement of the slide are shown in U.S. Pat. Nos. 2,643,521 and 2,984,074.

For most slides, elastomeric seals provide the best sealing arrangement. However, it is often difficult to obtain a good tight seal with elastomeric seals. Elastomeric seals also wear rapidly and thus they must be mounted in a manner whereby they can be easily replaced. Most known elastomeric seals used on the sides of a slide are constructed to provide a sealing surface on one side only of the seal. Thus, the known seals cannot always provide suitable sealing for the slide with water on either side of the slide. Most known elastomeric seals used on the top and bottom of the slide are of the type requiring abutting surfaces. However both the top and bottom abutting surfaces must abut simultaneously to obtain a good sealing and this is difficult to arrange.

SUMMARY OF THE INVENTION

It is the purpose of the present invention to provide improved sealing assemblies for control gates which give better sealing than known sealing assemblies, and which can be easily replaced if needed. It is another purpose of the present invention to provide sealing assemblies, particularly sealing assemblies extending in a direction parallel to the direction of slide travel, which are double acting in the sense that they seal no matter which side of the slide the water is on. It is a further purpose of the present invention to provide sealing assemblies, extending in a direction transverse to the direction of movement of the slide, which wedge together allowing better sealing simultaneously at the top and bottom of the slide. It is another purpose of the present invention to provide an improved control gate construction incorporating the improved sealing assemblies.

In accordance with the present invention there is provided an improved sealing assembly for sealing the sides of control gates in a direction parallel to the direction of movement of the slide, that employs an elastomeric seal having a U-shaped cross-section. The seal is mounted in the guide means along the sides of the opening and both arms of the U-shaped seal bear against one surface of the slide when the slide is in a closed position to seal it against water flowing past the side of the slide no matter on which side of the slide the water is located. The arms of the U-shaped seal flex out slightly in opposite directions when their free edges contact the slide at two parallel locations along each side. The seal is preferably constructed to enhance this movement. The resiliency of the seal causes the free edges of both arms to bear tightly against the slide thus blocking the flow of water past the seal from either direction. Thus the seal is double-acting in the sense that it can be used in the same position to prevent flow of water past the slide no matter which side of the slide the water is on. The U-shaped cross-section of the seal allows the seal to be mounted centrally thus permitting it to be positioned close to the edge of the opening and thereby requiring less mounting space.

The present invention also provides an improved sealing assembly for sealing control gates in a direction transverse to the direction of the slide travel. This sealing assembly employs a first sealing strip of elastomeric material mounted on one of the slide or a frame on the wall adjacent the top or bottom of the opening and having an angled sealing surface. A second sealing strip of elastomeric material is mounted on the other of the slide or frame and also has an angled sealing surface. The second sealing strip has a lateral projection adjacent its sealing surface. The two sealing strips are mounted to have their sealing surfaces face each other in an overlapping relationship. When the slide is moved relative to the frame to have the two sealing strips abut, the resilient, lateral projection gives slightly allowing the two angled sealing surfaces to make excellent sealing contact while wedging together. With one sealing strip designed to give slightly, the transverse sealing assemblies at both the top and bottom of the slide seal better since simultaneous sealing is not absolutely essential.

The invention is particularly directed toward a sealing assembly for a control gate of the type having: a frame mounted about an opening in a wall, and a slide movable relative to the frame to open or close the opening, the frame having at least one straight frame plate mounted against the wall adjacent the opening; said sealing assembly comprising an elastomeric seal strip having a U-shaped cross-section defined by a central web and a pair of arms extending transversely from the web, mounting means located between the arms, fastening means for fastening the mounting means to the one frame plate with the web of the seal strip sandwiched between the frame plate and the moving means, the mounting means dimensioned to have the arms of the seal strip project just past the mounting means when it is fastened to the frame plate so that the arms will resiliently contact the slide as the slide moves adjacent and parallel to the mounting means.

The invention is also directed toward a control gate incorporating this sealing assembly.

The invention is further directed toward a sealing assembly for a control gate of the type having: a frame mounted about an opening in a wall, and a slide movable relative to the frame to open or close the opening, the frame having at least one straight frame plate mounted against the wall and extending transversely to the direction of movement of the slide; said seal assembly having a first elastomeric seal strip adapted to be mounted on the frame plate, a second elastomeric seal strip adapted to be mounted on the slide, one of the seal strips having a bendable portion that projects in the path of relative movement of the other seal strip whereby when the two strips abut, the projecting portion gives slightly to give better sealing.

The invention is also directed toward a control gate incorporating this sealing assembly.

BRIEF DESCRIPTION OF THE DRAWINGS

FIG. 1 is a perspective view of a control gate;

FIG. 2 is a cross-section view of a portion of the control gate operating means;

FIG. 5 is a cross-section view of the seal strip in the first sealing assembly;

FIG. 6 is a cross-section view of a modified seal strip in the first sealing assembly;

FIG. 7 is a cross-section view of the top sealing assembly just before the slide closes the opening;

FIG. 8 is a cross-section view of the top sealing assembly with the slide closing the opening; and FIG. 9 is a cross-section view of the bottom sealing assembly with the slide closing the opening.

DESCRIPTION OF THE PREFERRED EMBODIMENTS

Figure 3:
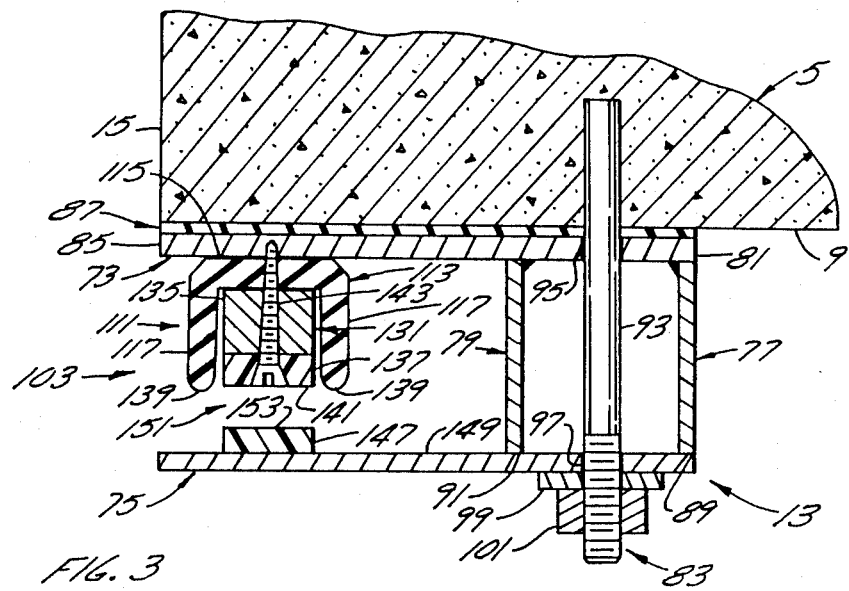
FIG. 3 is a cross-section view taken along line 3—3 of FIG. 1.

As shown in FIG. 1, a control gate 1 is provided to control the flow of water, or other liquid, through an opening 3 in a wall 5. The control gate 1 has a slide 7 mounted for up and down sliding movement adjacent one side 9 of the wall 5 to uncover or close the opening 3. The control gate 1 also has a guiding and sealing frame assembly 11 mounted on the one side 9 of the wall 5 about the opening 3. The frame assembly 11 has a pair of parallel, side guide means 13, each mounted on the side 9 of the wall 5 adjacent one of the sides 15 of the opening 3. Each guide means 13 extends vertically from the bottom 17 of the opening 3 to a position well above the top 19 of the opening. The sides 21 of the slide 7 are guided in the guide means 13 during up and down movement of the slide 7. The frame assembly 11 includes a bottom frame member 23 mounted on the side 9 of the wall 5 adjacent the bottom 17 of the opening 3. The bottom frame member 23 extends under, and adjacent to, the bottom ends 25 of the guide means 13 and acts as a stop for the slide 7. The bottom side 27 of the slide 7 abuts the bottom frame member 23 when the slide 7 closes the opening 3. The frame assembly 11 also has a top frame member 29 which extends between the guide means 13. The top frame member 29 is mounted on the side 9 of the wall 5 and is located adjacent the top side 19 of the opening 3. The top side 31 of the slide 7 is located adjacent the top frame member 29 of the frame assembly 11 when the slide 7 closes the opening 3.

The control gate 1 includes operating means 37 for moving the slide 7 up or down. The operating means 37 as shown in FIG. 1, has a vertical rod 39 fixedly mounted at its lower end 41 to a mounting block 43 fixed to back or outer side 45 of the slide 7 at about its center. The vertical rod 39 extends upwardly from the slide 7 through vertically spaced apart guide means 47 mounted on the side 9 of the wall 5. The rod 39 is free to move up or down relative to the guide means 47. The upper portion 49 of the rod 39 is threaded and freely passes up through a support tube 51 mounted on the top 53 of the wall 5 as shown in FIG. 2. A ring 55 is rotatably mounted at the top 57 of the tube 51. The outer surface of the ring 55 has a first bevel gear 59 formed thereon. The inner bore 61 of the ring is threaded. The rod 39 is threaded through the bore 61. Means 63 are provided for rotating the ring 55 within its mounting in the top 57 of the tube 51. These means include a crank rod 65 rotatably mounted within the top 57 of the tube 51 and extending transversely therefrom. A second bevel gear 67 is mounted at one end of the crank rod 65 to mesh with the first bevel gear 59. A crank handle 69 is mountd on the other end of the crank rod 65 outside of the tube 51. Rotation of the crank handle 69 will rotate the ring 61 within the tube 51 causing the rod 39 to rise or lower, depending on which way the ring 61 is rotated, and thus lifting or lowering the slide 7 to open or close the opening 3. While one form of operating means 37 for moving the slide 7 has been described, other forms of operating means can be employed.

Each guide means 13 for guiding the slide 7 during its up or down movement has an inner plate 73 and a parallel outer plate 75 as shown in FIG. 3. The outer plate 75 is spaced from the inner plate 73 by a pair of spacer bars 77, 79. The first spacer bar 77 is welded to inner plate 73 adjacent one side 81 of the inner plate 73. The second spacer bar 79 is spaced a short distance from the first bar 77 and also welded to the inner plate 73. The spacer bars 77, 79 are parallel to each other and extend transversely from the inner plate 73. Mounting means 83 mount the inner plate 73 against the side 9 of the wall 5 with its other side 85 generally adjacent the side 15 of the opening 3. A gasket 87 is interposed between the inner plate 73 and the side 9 of the wall 5. The mounting means 83 also connects the outer plate 75 against the outer ends 89, 91 of the spacer bars 77, 79 to position it relative to the inner plate 73. The mounting means 83 comprises a row of anchor bolts 93 set in the wall 5 which extend transversely from the side 9 of the wall 5. Each bolt 93 passes through an opening 95 in the inner plate 73, and opening 97 in the outer plate 75 and through the gasket 87. Each bolt 93 also passes between the spacer bars 77, 79. The gasket 87 and plates 73, 75 are mounted on the anchor bolts 93 and a washer 99 and nut 101 on each bolt 93 connects the plates 73, 75 to each other and to the wall 5.

Figure 4:
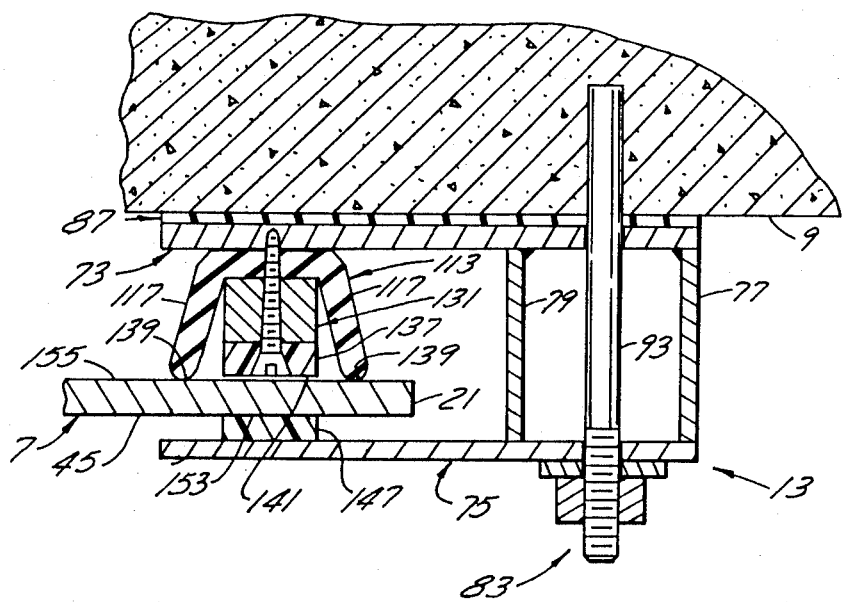
FIG. 4 is a cross-section view taken along line 4—4 of FIG. 1.

When the plates 73, 75 are mounted on the wall 5 and to each other, they define a slot 103 facing toward the opening 3 in the wall 5. A side edge 21 of the slide 7 is guided in the slot 103 of the guide means 13 during up and down movement of the slide 7 as shown in FIG. 4. A sealing assembly 111 is provided in the slot 103 of each guide means 13 to securely guide and tightly seal the slide 7 in the guide means 13. The sealing assembly 111 comprises a seal strip 113 made from a suitable elastomeric material such as a hard rubber. The seal strip 113, as shown in FIG. 5, has a U-shaped cross-section defined by a central web 115 and a pair of arms 117 extending transversely from the sides of the web 115. The two outer corners of the seal strip 113 are preferably bevelled as shown at 119, 121. The bevelling allows the arms 117 to pivot slightly away from each other, about their connections to the web 115 when sealing the slide 7, as will be described. In an alternative embodiment, as shown in FIG. 6, the corners of the seal strip 113' can be undercut as shown at 123, 125. The undercutting serves the same purpose as the bevelling, allowing the arms 117' to pivot slightly away from each other, about their connections to the web 115'.

Mounting means 131 are provided in the sealing assembly 111 for mounting the seal strip 113 within the slot to the guide means 13. The seal strip 113 is mounted to the inner plate 73 closely adjacent the other side 85 of the inner plate. The mounting means 131 includes a flat mounting plate 135 that is sized to fit into the seal strip 113 against its web 115 between the arms 117. The mounting plate 135 is preferably made of stainless steel. The mounting means 131 also preferably include a first guide strip 137. The guide strip 137 overlies the mounting plate 135 and is also located between the arms 117 of the seal strip 113. The first guide strip 137 is made from material which has good wear properties and a low coefficient of friction such as an ultra high molecular weight polyethylane. The first guide strip 137, and the mounting plate 135, are made to have a thickness, together, such that when both are mounted to the inner plate 73, with the web 115 of the seal strip 113 sandwiched between them, the ends 139 of the arms 117 of the seal strip 113 project just slightly past the outer surface 141 of the first guide strip 137. The mounting plate 131 and the first guide strip 141 are fastened to the inner plate 73 with suitable fastening means such as screws 143 with the web 115 of the seal strip 113 sandwiched between the mounting plate 131 and the inner plate 73. The screws 143 pass through the web 115.

The sealing assembly 111 also includes a second guide strip 147. The second guide strip 147 is made from the same material as the first guide strip 137 and is mounted opposite the first guide strip on the inner surface 149 of the outer plate 75 by adhesive or other suitable means (not shown). The dimensions of the slot 103 and the members of the sealing assembly 111 are selected to have the width of the gap 151 between the facing surfaces 141, 153 of the guide strips 137, 147 respectively just slightly wider than the thickness of the edge of the slide 7 that enters the slot 103 and gap 151 to lie between the guide strips 137, 147 to be guided.

In use, the scaling assembly 111 seals the slide 7 to the guide means 13 on the frame assembly 11 to prevent water flowing past the sides of the slide while it covers the opening 3. The slide 7 moves in the slot 103 in the guide means 13 and in the gap 151 in the sealing assembly 111 with its inner and outer surfaces 155, 45 lying closely adjacent to the first and second guide strips 137, 147 respectively. While in between the guide strips 137, 147, the slide 7 contacts the ends 139 of the arms 117 of the seal strip 113, bending them slightly outwardly. The arms 117 can bend outwardly slightly because of the bevel or undercutting on the outer corners where the arms 117 join the web 115. The resiliency of the seal strip 113 causes the bent arms 117 to tightly bear against the inner surface 155 of the slide 7, while pushing the slide against the inner surface 153 of second guide strip 147. The arms 117 of the seal strip 113 prevent any water from flowing around the sides 21 of the slide 7.

A second seal assembly 161 is provided to seal the top side 31 of the slide 7 to the top frame member 29 of the frame assembly 11. As shown in FIG. 7, the top frame member 29 comprises a flat plate 163 extending across the side 9 of the wall 5 between the guide means 13. The lower edge 165 of the top plate 163 is generally aligned with the top side 19 of the opening 3. Machine screws 167 fasten the top plate 163 to the wall 5, the screws passing through countersunk holes in the top plate and connecting to sockets or plugs 169 set in the wall 5. A sealing gasket 171 is interposed between the top plate 163 and the wall 5 with the screws 167 passing through the gasket.

The second seal assembly 161 has a first seal member 175 made in the form of a strip. The strip, when viewed in cross-section, has a flat mounting side 177 extending between two narrow edges 179, 181. The other side of the strip has an angled surface 183 that slopes toward one narrow edge 179. The other side is also stepped down from the angled surface 183 as shown at 185 to a flat surface 187 that extends from the step 185 to the other edge 181 and is generally parallel to the flat side 177. The first seal member 175 is made of a suitable resilient material such as fairly hard rubber having a durometer harness of 60 to 65.

A flat mounting plate 191, thinner than the depth of stop 185, is sized to fit over the flat surface 187. The mounting plate 191, made of metal, is used to fasten the first seal member 175 to the top plate 163 with its flat side 177 against the plate 163 and its angled surface 183 at the top. The mounting plate 191 is fastened to the top plate 163 with suitable fasteners 193 with the lower part of the seal member 175 sandwiched between them. The bottom edge 181 of the seal member 175 is generally aligned with the bottom edge 165 of the top plate 163. It will be noted that a portion 195 of the seal member 175 projects past the mounting plate 191.

The second seal assembly 161 also has a second seal member 201 in the form of a strip. This second seal member, when viewed in cross-section, has a flat mounting side 203, a first bevelled edge 205, a second square edge 207, and an outer side 209. The outer side 209 is stepped down as shown at 211 toward the square edge 207. This second seal member 201 is also made of suitable resilient material such as fairly hard rubber having a durometer hardness of 70 to 75. A flat mounting plate 213, sized to fit into the stepped down portion of the seal member 201, is used to fasten it to the inner side 155 of the slide 7, adjacent its top side 31, with the bevelled edge 205 facing down. The mounting plate 213 is fastened to the slide 7 with the second seal member 201 sandwiched between them with suitable fasteners 215.

In use, as the slide 7 reaches its bottom position to close the opening, the bevelled edge 205 of the second seal member 201 on the slide 7 contacts the angled surface 183 of the first seal member 175 on the frame. The contact is made at the projecting portion 195. Thus the slightly harder second seal member 201 can push against the projecting portion of the first seal member 175 to ensure a good seal between the slide and frame. The projecting portion 195 of the first seal member 175 will both give slightly, and move down slightly over the mounting plate 191 to make good sealing contact with the second seal member 201, as shown in FIG. 8.

In an alternative arrangement, the first seal member 175 could be mounted on the slide 7 in a reversed position, and the second seal member 201 could be mounted on the frame, also in a reversed position, so that seal member 175 is moved relative to seal member 201.

A third seal assembly 221 is provided at the bottom of the control gate. The third seal assembly 221 is mounted on the bottom frame member 23. As shown in FIG. 9, this bottom frame member 23 comprises an angle member having first and second legs 223, 225. The bottom frame member 23 is mounted against the side 9 of the wall 5 with the first leg 223 against the wall and the second leg 225 extending transversely therefrom. A set of anchor bolts 227, set in the wall 5, is used to mount the angle onto the wall. Nuts 229 securely fasten the angle against the wall 5 with a gasket 231 interposed between them. A sealing member 233, in strip form, is fastened to the top surface of the second leg 225. The sealing member 233 has a generally rectangular shape except for a step 235 on its top, outer side. A mounting plate 237 fits in the step 235 and is fastened to the leg 225 with suitable fastening means 239, sandwiching the sealing member 233 between it and the leg 225. The sealing member 233 is made from suitable resilient material, such as a hard rubber.

In use, when the control gate 1 is closed, the slide 7 contacts the top surface 241 of the sealing member 233 swich its bottom edge 27. This contact occurs simultaneously with contact being made in the second sealing assembly between the slide 7 and the frame 29 so as to seal the slide 7 at the top and at the bottom. With the slide 7 also sealed at its sides, the slide 7 closes the opening 3 to water flow.

The bottom ends of the side seal strips 113 in the side guide means 13 abut the top surface 241 of the bottom sealing member 233 and are fastened to the bottom sealing member 233 by vulcanizing or other suitable means. Similarly the ends of the first seal member 175 in the second seal assembly at the top of the frame 11 abut the side seal strips 113 in the first seal assembly 111 and are fastened thereto by vulcanizing or other suitable means. Thus a watertight seal assembly is formed about the frame 11.

A seal assembly similar to the second seal assembly 161, used at the top of the frame and the slide, could also be used at the bottom, replacing the third seal assembly 221 if desired. Also the first seal assembly 111, without the second seal strip 147, could be used at the top of the frame, replacing the second seal assembly 161. Both seal strips 175, 201 of the second seal assembly 161 would be removed and the first seal assembly 111 could be mounted on frame plate 163 to have the arms 117 of its seal strip 113 abut the inner surface 155 of the slide 7 near its top edge 31.

I claim:

1. A sealing assembly for a control gate of the type having; a frame mounted about an opening in a wall; and a slide movable relative to the frame to open or close the opening, the frame having a first straight frame plate mounted against the wall adjacent the opening and a second straight frame plate, parallel to, but spaced from the first frame plate, the frame plates defining a guide slot between them in which the side of the slide moves; the sealing assembly located in the guide slot and having an elastomeric seal strip with a U-shaped cross-section defined by a central web and a pair of arms extending transversely from the sides of the web, mounting means located between the arms, means fastening the mounting means to the first frame plate with the web of the seal strip sandwiched tightly between the first frame plate and the mounting means, the mounting means spaced from the second frame plate a distance slightly greater than the thickness of the side of the slide, the free ends of the arms of the seal strip spaced from the second frame plate a distance slightly less than the thickness of the side of the slide.

2. A sealing assembly as claimed in claim 1 wherein the mounting means includes an inner mounting plate and an outer guide strip, the second frame plate having a second guide strip located opposite the first guide strip, both guide strips made from a material having a low coefficient of friction.

3. A sealing assembly as claimed in claim 1 wherein each arm extends transversely from the web at a corner of the seal strip, said corner being bevelled thereby allowing the arm to bend outwardly away from the other arm slightly more easily when the arms are contacted by the slide.

4. A sealing assembly as claimed in claim 1 wherein each arm extends transversely from the web at a corner of the seal strip, said corner being undercut thereby allowing the arm to bend outwardly away from the other arm slightly more easily when the arms are contacted by the slide.

5. A control gate having a frame with top, bottom and side frame members mounted about an opening in a wall, a slide having a top, bottom and sides movable relative to the frame to open or close the opening, the side frame members each having an inner side plate and an outer side plate forming a guide slot to receive the sides of the slide, a sealing assembly within the slot, the sealing assembly having an elastomeric seal strip with a U-shaped cross-section defined by a central web and a pair of arms extending transversely from the sides of the web, mounting means located between the arms, fastening means for fastening the mounting means to one of the side plates within the slot with the web of the seal strip sandwiched tightly between the mounting means and the one side plate, the mounting means dimensioned to have the arms of the seal strip project just past the mounting means toward the other side plate when it is fastened to the one side plate so that the arms will resiliently contact the slide as it moves in the slot between the mounting means and the other side plate.

6. A control gate as claimed in claim 5 including a second sealing assembly extending transverse to the direction of movement of the slide, said second sealing assembly having a first elastomeric seal strip mounted on one of the frame or slide, a second elastomeric seal strip mounted on the other of the frame or slide, one of the first and second seal strips having an abutting portion that projects into the relative path of movement of the other seal strip, said one seal strip fixed to have the projecting abutting portion bend in the direction of relative movement when abutted by the other seal strip.

7. A control gate as claimed in claim 19 wherein the mounting means comprises an inner mounting plate and an outer guide strip.

8. A control gate as claimed in claim 7 wherein the sealing assembly includes a second guide strip mounted within the slot on the other side plate opposite the first, outer guide strip, the two guide strips defining a gap just slightly wider than the thickness of the slide and the arms of the seal strip extending into the gap.

9. A control gate as claimed in claim 19 wherein each arm extends transversely from the web at a corner of the seal strip, said corner being bevelled thereby allowing the arm to bend outwardly away from the other arm slightly more easily when the arms are contacted by the slide.

10. A control gate as claimed in claim 5 wherein each arm extends transversely from the web at a corner of the seal strip, said corner being undercut thereby allowing the arm to bend outwardly away from the other arm slightly more easily when the arms are contacted by the slide.

11. A control gate as claimed in claim 6 wherein said one seal strip is slightly softer than the other seal strip to provide fore better sealing.

12. A control gate having a frame with generally vertical and horizontal side members mounted about an opening in a wall, a slide having vertical and horizontal sides movable relative to the frame to open or close the opening, a sealing assembly at one of the horizontal sides of the frame and slide, the sealing assembly having a first elastomeric seal strip mounted on one of the frame or slide, a second elastomeric seal strip mounted on the other of the frame or slide, one of the first and second seal strips having an abutting portion that projects into the relative path of movement of the other seal strip, said one seal strip fixed to have the projecting abutting portion bend in the direction of relative movement when abutted by the other seal strip.

13. A control gate as claimed in claim 12 wherein said one seal strip is made of slightly softer material than the other seal strip.

14. A sealing assembly for a control gate of the type having: a frame mounted about an opening in a wall, and a slide movable relative to the frame to open or close the opening, the frame having at least one straight frame plate mounted against the wall and extending transversely to the direction of movement of the slide; said sealing assembly having a first elastomeric seal strip adapted to be mounted on the frame plate, a second elastomeric seal strip adapted to be mounted on the slide, one of the seal strips having an abutting portion that projects into the relative path of movement of the other seal strip, said one seal strip fixed to have the projecting abutting portion bend in the direction of relative movement when abutted by the other seal strip.

* * * * *